United States Patent
Zhang et al.

(10) Patent No.: US 10,643,056 B2
(45) Date of Patent: May 5, 2020

(54) FINGERPRINT RECOGNITION METHOD AND RELATED PRODUCTS

(71) Applicant: GUANGDONG OPPO MOBILE TELECOMMUNICATIONS CORP., LTD., Dongguan, Guangdong (CN)

(72) Inventors: Haiping Zhang, Guangdong (CN); Yibao Zhou, Guangdong (CN)

(73) Assignee: GUANDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 97 days.

(21) Appl. No.: 16/013,746

(22) Filed: Jun. 20, 2018

(65) Prior Publication Data
US 2019/0034696 A1   Jan. 31, 2019

(30) Foreign Application Priority Data

Jul. 31, 2017  (CN) .......................... 2017 1 0638262

(51) Int. Cl.
*G06K 9/00*   (2006.01)
*G06K 9/20*   (2006.01)
(Continued)

(52) U.S. Cl.
CPC ......... *G06K 9/00087* (2013.01); *G06F 21/32* (2013.01); *G06F 21/83* (2013.01);
(Continued)

(58) Field of Classification Search
CPC ....... G06F 21/32; G06F 21/83; G06K 9/0002; G06K 9/0004; G06K 9/00067;
(Continued)

(56) References Cited

U.S. PATENT DOCUMENTS

| | | |
|---|---|---|
| 2014/0294259 A1 | 10/2014 | Lee |
| 2015/0074796 A1 | 3/2015 | Meir et al. |
| 2015/0371073 A1* | 12/2015 | Cho ................... G06K 9/00013 382/124 |

FOREIGN PATENT DOCUMENTS

| | | | |
|---|---|---|---|
| CN | 201638241 | * | 11/2010 |
| CN | 201638241 U | | 11/2010 |

(Continued)

OTHER PUBLICATIONS

Machine translation of CN 205942699, Nov. 2019, Google Patents, pp. 1-5 (Year: 2019).*

(Continued)

*Primary Examiner* — Edward Park
(74) *Attorney, Agent, or Firm* — Lathrop GPM LLP (57) ABSTRACT

Embodiments of the present disclosure provide a fingerprint recognition method and related products. The method may include: acquiring by the mobile terminal a first fingerprint image in a first fingerprint recognition mode; matching the first fingerprint image and a first enrolled fingerprint template; acquiring a second fingerprint image in a second fingerprint recognition mode, in response to detecting a number of consecutive occurrences of failure matching event; verifying whether the second fingerprint image is a valid fingerprint image; and determining that fingerprint is verified when the second fingerprint image is the valid fingerprint image.

12 Claims, 8 Drawing Sheets

(51) Int. Cl.
*G06F 21/32* (2013.01)
*G06F 21/83* (2013.01)
*G06K 9/03* (2006.01)
*H04M 1/725* (2006.01)

(52) U.S. Cl.
CPC ......... *G06K 9/0002* (2013.01); *G06K 9/0004* (2013.01); *G06K 9/00067* (2013.01); *G06K 9/00919* (2013.01); *G06K 9/036* (2013.01); *G06K 9/209* (2013.01); *H04M 1/72577* (2013.01)

(58) Field of Classification Search
CPC ........... G06K 9/00087; G06K 9/00919; G06K 9/036; G06K 9/209; H04M 1/72577
See application file for complete search history.

(56) References Cited

FOREIGN PATENT DOCUMENTS

| | | | |
|---|---|---|---|
| CN | 104978572 | A | 10/2015 |
| CN | 106227437 | A | 12/2016 |
| CN | 106355150 | A | 1/2017 |
| CN | 106407952 | A | 2/2017 |
| CN | 205942699 | * | 2/2017 |
| CN | 205942699 | U | 2/2017 |
| CN | 106529498 | A | 3/2017 |
| CN | 106716444 | A | 5/2017 |
| CN | 106934389 | A | 7/2017 |
| CN | 206331449 | U | 7/2017 |
| CN | 107451573 | A | 12/2017 |
| CN | 107480609 | A | 12/2017 |
| CN | 107480610 | A | 12/2017 |
| JP | 2006031304 | A | 2/2006 |
| JP | 2009099113 | A | 5/2009 |
| KR | 20130065041 | A | 6/2013 |
| WO | WO 2017000346 | A1 | 1/2017 |

OTHER PUBLICATIONS

Machine translation of CN 201638241, Nov. 2019, Google Patents, pp. 1-4 (Year: 2019).*

PCT/CN2018/094592 International Search Report and Written Opinion dated Sep. 27, 2018, 10 pages.

European Patent Application No. 18181881.6 extended Search and Opinion dated Dec. 10, 2018, 10 pages.

Chinese Patent Application No. 201710638262.4, Office Action dated Jul. 29, 2019, 9 pages.

Chinese Patent Application No. 201710638262.4, English translation of Office Action dated Jul. 29, 2019, 9 pages.

* cited by examiner

Fig. 6

FINGERPRINT RECOGNITION METHOD AND RELATED PRODUCTS

CROSS-REFERENCE TO RELATED APPLICATIONS

This application is based on and claims priority of Chinese Patent Application No. 201710638262.4, filed on Jul. 31, 2017, the entire contents of which are incorporated herein by reference.

TECHNICAL FIELD

The present disclosure relates to a field of mobile terminals, and more particularly relates to a fingerprint recognition method and related products.

BACKGROUND

With popularization of mobile terminals such as smart phones, tablet computers or the like, almost everyone in modern life owns a mobile phone. In order to ensure security of the mobile phone, typically, a fingerprint recognition is needed for unlocking a screen of the mobile phone to enhance the security. However, during the fingerprint recognition, the user needs to perform an operation of pressing a fingerprint recognition region of the mobile phone with finger pulp of a finger, which has a low efficiency of fingerprint recognition in some special cases (for example, the finger is greasy, wet, or peeling) and leads to a slow unlocking speed.

SUMMARY

Embodiments of the present disclosure provide a fingerprint recognition method and related products.

Embodiments of the present disclosure provide a mobile terminal. The mobile terminal includes a circuitry, a first fingerprint recognition component associated with the circuitry, and a second fingerprint recognition component associated with the circuitry. The first fingerprint recognition component is configured to acquire a first fingerprint image in a first fingerprint recognition mode. The circuitry is configured to match the first fingerprint image and a first enrolled fingerprint template. The second fingerprint recognition component is configured to acquire a second fingerprint image in a second fingerprint recognition mode, in response to detecting a number of consecutive occurrences of failure matching event. The first fingerprint recognition mode is different from the second fingerprint recognition mode. The circuitry is further configured to verify whether the second fingerprint image is a valid fingerprint image, and to determine that fingerprint is verified when the second fingerprint image is the valid fingerprint image.

Embodiments of the present disclosure provide a fingerprint recognition method. The method includes: acquiring a first fingerprint image in a first fingerprint recognition mode; matching the first fingerprint image and a first enrolled fingerprint template; acquiring a second fingerprint image in a second fingerprint recognition mode, in response to detecting a number of consecutive occurrences of failure matching event, in which the first fingerprint recognition mode is different from the second fingerprint recognition mode; verifying whether the second fingerprint image is a valid fingerprint image; and determining that fingerprint is verified when the second fingerprint image is the valid fingerprint image.

Embodiments of the present disclosure provide a non-transitory computer readable storage medium having computer programs for exchanging digital data stored thereon, in which the computer programs are configured to cause a computer to perform all or a part of acts of the method according to the embodiments of the present disclosure.

BRIEF DESCRIPTION OF THE DRAWINGS

In order to make the technical solutions of embodiments of the present invention more clearly, the accompanying drawings used in the description of embodiments of the present invention are briefly described herein. Obviously, the described drawings are merely some embodiments of present invention. For persons skilled in the art, other drawings may be obtained based on these drawings without any creative work.

DETAILED DESCRIPTION

The technical solutions in embodiments of the present invention are hereinafter described clearly and completely with reference to accompanying drawings in embodiments of the present invention. Apparently, embodiments described are a part of embodiments of the present invention, but not all embodiments. All other embodiments obtained by those skilled in the art based on the embodiments in the present invention without creative labor shall fall in the protection scope of the present invention.

Terms such as "first", "second" and the like used in the specification, in claims and in drawings are configured herein for distinguishing different subjects, but not for showing a particular sequence. Furthermore, the terms such as "include", "comprise" and any other variations thereof are intended to be non-exclusive. For example, a process, a method, a system, a product or a device including or comprising a sequence of blocks or units is not limited to include or comprise the listed blocks or unit, instead, they alternatively further include or comprise other blocks and units that are not listed or alternatively further include inherent blocks or units of the process, the method, the system, the product or the device.

Term such as "embodiments" referred in the present disclosure means that, particular features, structures and characteristics described in combination with embodiments may be covered in at least one embodiment of the present disclosure. Usages of the term for many times in the specification are not necessary to refer to a same embodiment or same embodiments, and they are not independent embodiments mutually exclusive with other embodiments or unimportant embodiments. It may be explicitly or implicitly understood by those skilled in the art that, embodiments described herein can be combined with other embodiments.

The mobile terminal described in embodiments of the present disclosure may include various devices having a wireless communication function, such as a portable device, a vehicle-mounted device, a wearable device, a computing device or other processing device connected to a wireless modem, various forms of user equipments (UEs), mobile stations (MSs), terminal devices and the like. For ease of description, the above-mentioned devices are collectively referred to as mobile terminals.

Embodiments of the present disclosure will be described in detail below.

Figure 1A:
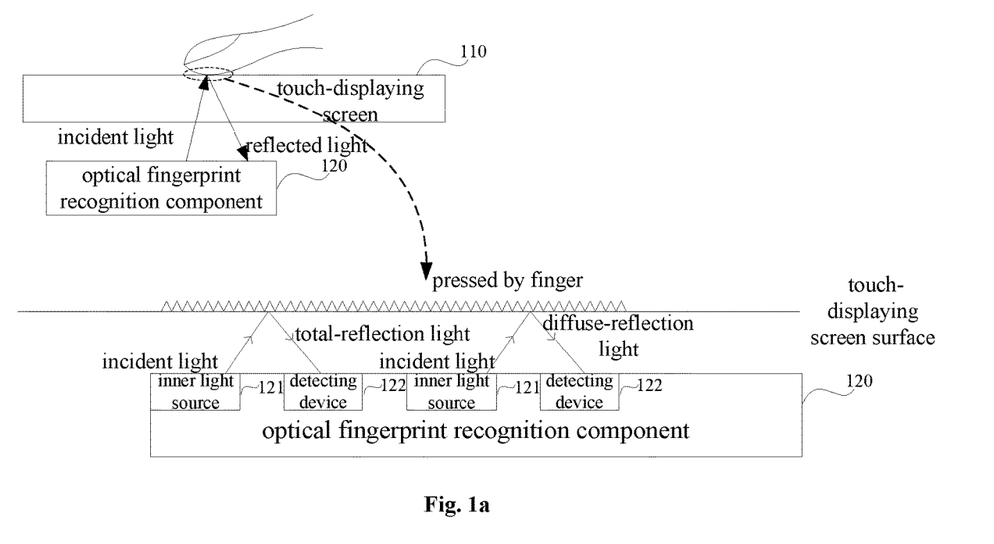
FIG. 1a is a schematic diagram illustrating an operating principle of an optical fingerprint recognition component according to an embodiment of the present disclosure.

In order to have a better understanding of the embodiments of the present disclosure, operating principles of an optical fingerprint recognition and a capacitive fingerprint recognition provided by embodiments of the present disclosure will be described in detail firstly. Referring to FIG. 1a, FIG. 1a is a schematic diagram illustrating an operating principle of an optical fingerprint recognition component according to an embodiment of the present disclosure. As illustrated in FIG. 1a, a touch-displaying screen 110 and an optical fingerprint recognition component 120 are included. The optical fingerprint recognition component 120 includes an inner light source 121 and a detecting device 122. The detecting device 122 may be a charge couple device (CDD) array. The optical fingerprint recognition component 120 may include at least one inner light source 121 and at least one detecting device 122. The inner light source 121 may emit incident light. The incident light may be reflected at a region where a touch-displaying screen surface is in contact with a finger. The reflected light is received by the detecting device 122 and converted to electric signal data. The optical fingerprint recognition component 120 may identify the incident light in contact with bulge portions of the fingerprint (ridges of the fingerprint) and the incident light in contact with sunken portions of the fingerprint (valleys of the fingerprint) according to a total reflection principle.

Referring to an enlarged area indicated by the dotted line in FIG. 1a, the ridges of the fingerprint are in contact with the touch-displaying screen surface, while the valleys of the fingerprint are not in contact with the touch-displaying screen surface. When the incident light generated by the optical fingerprint recognition component 120 is emitted on the valleys of the fingerprint, the incident light is emitted on a surface of the touch-displaying screen in contact with air. In this case, by designing an incident angle of the incident light, the incident light can be totally reflected (a refractive index of material of the touch-displaying screen is greater than 1, a refractive index of air is approximately equal to 1, i.e., it is required to set the refractive index of the material of the touch-displaying screen greater than the refractive index of air). Thus, the optical fingerprint recognition component 120 may receive total-reflection light with a high intensity. When the incident light generated by the optical fingerprint recognition component 120 is emitted on the ridges of the fingerprint, the incident light is emitted on a surface of the touch-displaying screen in contact with the bulge portions of the fingerprint. In this case, the incident light is emitted on the bulge portions of the finger and a diffuse reflection occurs. Thus, the optical fingerprint recognition component 120 may receive diffuse-reflection light with a low intensity. The optical fingerprint recognition component 120 may form a fingerprint image according to the intensity of the received light.

Figure 1B:
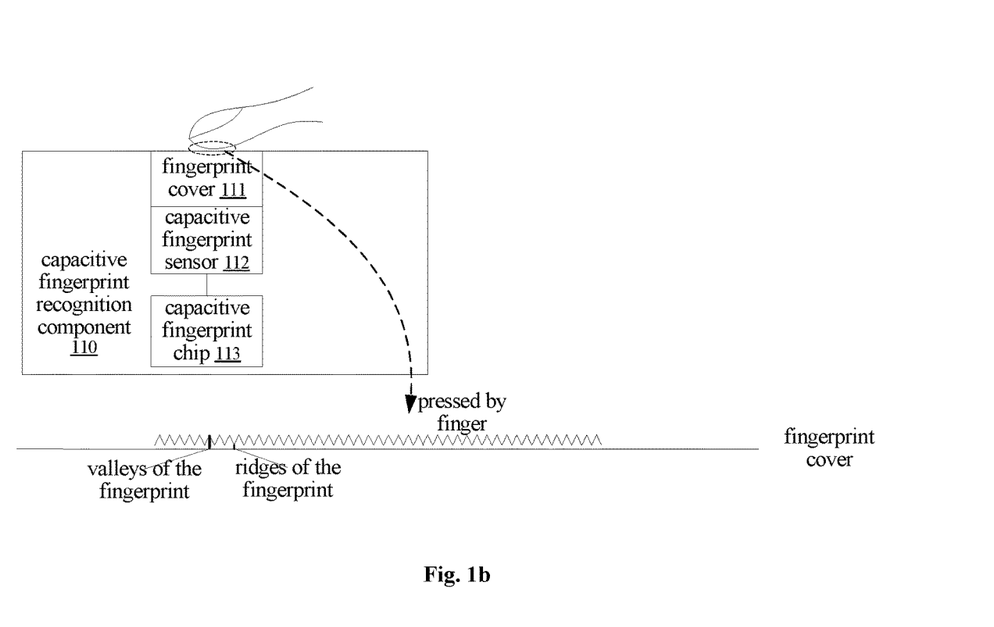
FIG. 1b is a schematic diagram illustrating an operating principle of a capacitive fingerprint recognition component according to an embodiment of the present disclosure.

Referring to FIG. 1b, FIG. 1b is a schematic diagram illustrating an operating principle of a capacitive fingerprint recognition component according to an embodiment of the present disclosure. As illustrated in FIG. 1b, the capacitive fingerprint recognition component 110 includes a fingerprint cover 111, a capacitive fingerprint sensor 112 and a capacitive fingerprint chip 113. The capacitive fingerprint sensor 112 is configured to detect capacitance between bulge portions of the fingerprint (ridges of the fingerprint) and the fingerprint cover 111 and to detect capacitance between sunken portions of the fingerprint (valleys of the fingerprint) and the fingerprint cover 111. Since the ridge of the fingerprint and the valley of the fingerprint have different distances from the fingerprint cover 111, the capacitance between the ridges of the fingerprint and the fingerprint cover 111 is different from the capacitance between the valleys of the fingerprint and the fingerprint cover 111 due to a principle of parallel capacitors. After a finger presses on the fingerprint cover 111, the capacitive fingerprint sensor 112 can detect capacitance distribution on the fingerprint cover 111, and the capacitive fingerprint chip 113 can generate a fingerprint image according to the capacitance distribution on the fingerprint cover 111 detected by the capacitive fingerprint sensor 112.

Both of the fingerprint recognition modes illustrated in FIG. 1a and FIG. 1b can be applied to a mobile terminal. The fingerprint recognition according to embodiments of the present disclosure is applicable to screen unlocking, mobile payment or other scenes requiring a security authentication.

Figure 1C:
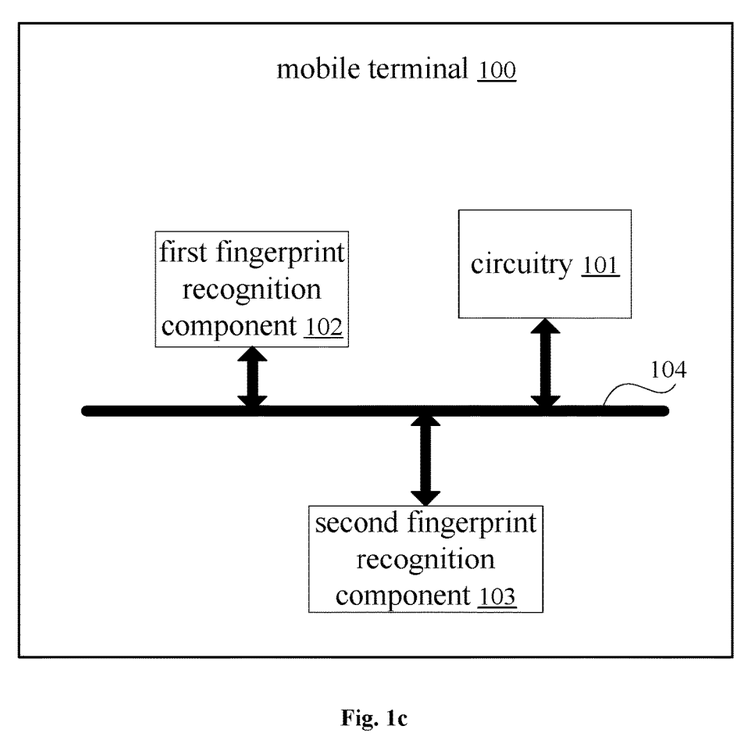
FIG. 1c is a structure diagram of a mobile terminal according to an embodiment of the present disclosure.

Referring to FIG. 1c, FIG. 1c is a structure diagram of a mobile terminal according to an embodiment of the present disclosure. As illustrated in FIG. 1c, the mobile terminal 100 includes a circuitry 101, such as an application processor (AP), an integrated circuit or the like, a first fingerprint recognition component 102, and a second fingerprint recognition component 104. The circuitry 101 is associated with the first fingerprint recognition component 102 and the second fingerprint recognition component 103, for example, the circuitry 101 is coupled to the first fingerprint recognition component 102 and the second fingerprint recognition component 103 via a bus 104.

The first fingerprint recognition component 102 is configured to acquire a first fingerprint image in a first fingerprint recognition mode.

In an embodiment of the present disclosure, the first fingerprint recognition component 102 is configured to acquire the first fingerprint image within the first fingerprint recognition region in the first fingerprint recognition mode.

Figure 1D:
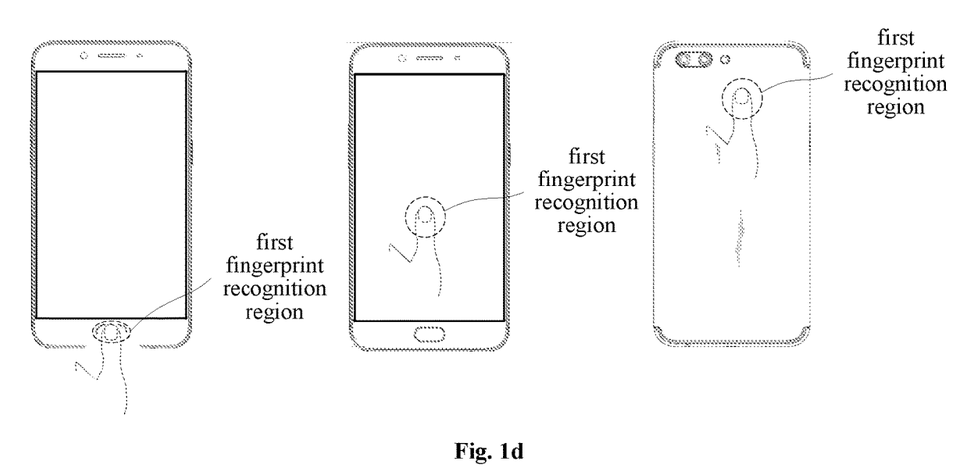
FIG. 1d is a schematic diagram illustrating a fingerprint recognition region according to an embodiment of the present disclosure.

In an embodiment of the present disclosure, when a fingerprint collecting instruction is received, a user may press a finger in a first fingerprint recognition region. The first fingerprint recognition component 102 acquires the first fingerprint image within the first fingerprint recognition region in the first fingerprint recognition mode. The first fingerprint recognition region may be located on a front cover (including a displaying area and a non-displaying area) or a rear cover of the mobile terminal 100. A shape of the first fingerprint recognition region may be a circle, an ellipse, a quadrangle (such as a rectangle), a shape like the fingerprint of the finger and so on, which will not be limited herein. FIG. 1d is a schematic diagram illustrating a fingerprint recognition region according to an embodiment of the present disclosure. At left of FIG. 1d, the first fingerprint recognition region is located in the non-displaying area. In the middle of FIG. 1d, the first fingerprint recognition region is located in the displaying area. At right of FIG. 1d, the first fingerprint recognition region is located on the rear cover. The first fingerprint recognition mode may be the optical fingerprint recognition mode or the capacitive fingerprint recognition mode.

The circuitry 101 is configured to match the first fingerprint image and a first enrolled fingerprint template.

In an embodiment of the present disclosure, the fingerprint template is generated according to fingerprint feature information extracted from one or more fingerprint images acquired previously. When the circuitry 101 matches the first fingerprint image and the first enrolled fingerprint template, the circuitry 101 is configured to extract a fingerprint feature from the first fingerprint image, and to match the extracted fingerprint feature and the first enrolled fingerprint template. When a matching degree between the first fingerprint image and the first enrolled fingerprint template is greater than an enrolled threshold, the circuitry 101 determines that the first fingerprint image and the first enrolled fingerprint template are matched and that fingerprint is verified successfully, such that operations such as screen unlocking, payment can be performed. When the matching degree between the first fingerprint image and the first enrolled fingerprint template is less than the enrolled threshold, the circuitry 101 determines that the first fingerprint image and the first enrolled fingerprint template are not matched. The first fingerprint recognition component 102 continues to acquire the first fingerprint image. The circuitry 101 continues to match the first fingerprint image and the first enrolled fingerprint template.

The second fingerprint recognition component 103 is configured to acquire a second fingerprint image in a second fingerprint recognition mode, in response to detecting a number of consecutive occurrences of failure matching event.

In an embodiment of the present disclosure, the second fingerprint recognition component 103 is configured to acquire the second fingerprint image within the second fingerprint recognition region in the second fingerprint recognition mode. The second fingerprint recognition region may be located on a front cover (including a displaying area and a non-displaying area) or a rear cover of the mobile terminal 100. A shape of the second fingerprint recognition region may be a circle, an ellipse, a quadrangle (such as a rectangle), a shape like the fingerprint of the finger and so on, which will not be limited herein. The second fingerprint recognition region and the first fingerprint recognition region do not overlap with each other. In this case, the first fingerprint recognition component 102 and the second fingerprint recognition component 103 are disposed within different regions.

In another embodiment of the present disclosure, the second fingerprint recognition component 103 is configured to acquire the second fingerprint image within the first fingerprint recognition region in the second fingerprint recognition mode. In this case, the first fingerprint recognition component 102 and the second fingerprint recognition component 103 are disposed within the same region. In one embodiment, the first fingerprint recognition component 102 and the second fingerprint recognition component 103 are stacked on each other, and an additional control circuitry can be disposed for controlling one of them to work. In another example, the second fingerprint recognition component 103 and the first fingerprint recognition component 102 are closely disposed within the same region. For example, when the first fingerprint recognition component 102 is an optical fingerprint recognition component while the second fingerprint recognition component 103 is a capacitive fingerprint recognition component, the optical fingerprint recognition component is disposed right below a fingerprint collecting area, and the capacitive fingerprint recognition component is disposed closely adjacent to the optical fingerprint recognition component.

In an embodiment of the present disclosure, the second fingerprint recognition mode is different from the first fingerprint recognition mode. When a predetermined number of consecutive occurrences of failure matching event are detected, it indicates that the first fingerprint recognition component 102 has a bad fingerprint recognition effect. In this case, the fingerprint recognition mode is switched from the first fingerprint recognition mode to the second fingerprint recognition mode, and the second fingerprint image is acquired in the second fingerprint recognition mode. The predetermined number may be an integer, for example, may be 1, 2, 3, and so on.

In an embodiment, the first fingerprint recognition mode is a capacitive fingerprint recognition mode, and the second fingerprint recognition mode is an optical fingerprint recognition mode.

In another embodiment, the first fingerprint recognition mode is an optical fingerprint recognition mode, and the second fingerprint recognition mode is a capacitive fingerprint recognition mode.

Generally, in a situation that the user's finger is dry, the optical fingerprint recognition has a bad recognition effect while the capacitive fingerprint recognition has a good recognition effect. In a situation that the user's finger is wet or greasy, the optical fingerprint recognition has a good recognition effect while the capacitive fingerprint recognition has a bad recognition effect. For example, when the first fingerprint recognition mode is the capacitive fingerprint recognition mode, the second fingerprint recognition mode is the optical fingerprint recognition mode. When the user's finger is wet or greasy, if the capacitive fingerprint recognition mode is used in the beginning, a bad fingerprint recognition effect is caused, such that the matching degree of the fingerprint image is low and it is prone to occurrence of failure matching event. When the predetermined number of consecutive occurrences of failure matching event is detected for the capacitive fingerprint image, the optical fingerprint recognition mode is used to acquire an optical fingerprint image and verification is performed on the optical fingerprint image to determine whether the optical fingerprint image is a valid image. However, if the optical fingerprint recognition mode is used in the beginning, it is prone to occurrence of successful fingerprint recognition.

For another example, when the first fingerprint recognition mode is the optical fingerprint recognition mode, the second fingerprint recognition mode is the capacitive fingerprint recognition mode. When the user's finger is dry, if the optical fingerprint recognition mode is used in the beginning, a bad fingerprint recognition effect is caused, such that the matching degree of the fingerprint image is low and it is prone to occurrence of failure matching event. When the predetermined number of consecutive occurrences of failure matching event is detected for the optical fingerprint image, the capacitive fingerprint recognition mode is used to acquire a capacitive fingerprint image and verification is performed on the capacitive fingerprint image to determine whether the capacitive fingerprint image is a valid image. However, if the capacitive fingerprint recognition mode is used in the beginning, it is prone to occurrence of successful fingerprint recognition.

The circuitry 101 is further configured to verify whether the second fingerprint image is a valid fingerprint image.

In an embodiment of the present disclosure, when the circuitry 101 verifies whether the second fingerprint image is a valid fingerprint image, the circuitry 101 is configured to match the second fingerprint image and a second enrolled fingerprint template corresponding to the second fingerprint recognition mode. In an embodiment, the circuitry 101 may extract a fingerprint feature from the second fingerprint image, and match the extracted fingerprint feature and the second enrolled fingerprint template. When a matching degree between the second fingerprint image and the second enrolled fingerprint template is greater than an enrolled threshold, the circuitry 101 determines that the second fingerprint image and the second enrolled fingerprint template are matched and that fingerprint is verified successfully, such that operations such as screen unlocking, payment can be performed. When the matching degree between the second fingerprint image and the second enrolled fingerprint template is less than the enrolled threshold, the circuitry 101 determines that the second fingerprint image and the second enrolled fingerprint template are not matched. The second fingerprint recognition component 103 continues to acquire the second fingerprint image. The circuitry 101 continues to match the second fingerprint image and the second enrolled fingerprint template.

When the mobile terminal illustrated in FIG. 1c is implemented, if the predetermined number of consecutive occurrences of failure matching event are detected in the case of the first fingerprint recognition mode, the fingerprint recognition mode is switched to the second fingerprint recognition mode automatically, such that an appropriate fingerprint recognition mode can be quickly selected for fingerprint recognition, thus improving the speed of fingerprint recognition.

Figure 1E:
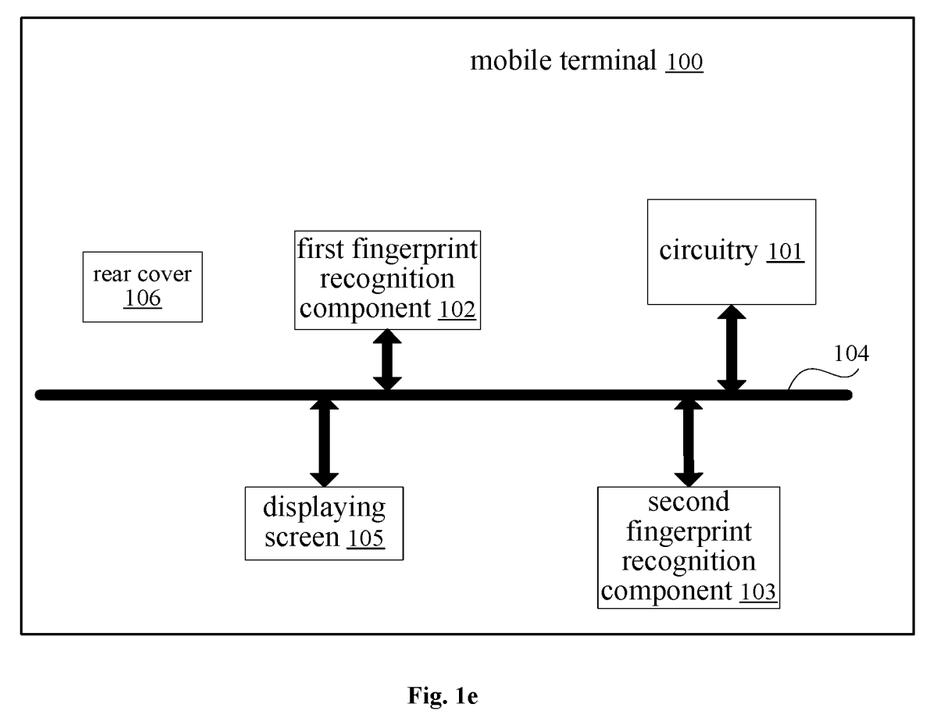
FIG. 1e is a structure diagram of a mobile terminal according to another embodiment of the present disclosure.

In an embodiment, as illustrated in FIG. 1e, the mobile terminal further includes a displaying screen 105 and a rear cover 106. The first fingerprint recognition region is located on the displaying screen 105 of the mobile terminal 100 and the second fingerprint recognition region is located on the rear cover 106 of the mobile terminal 100.

In an embodiment, the first fingerprint recognition region is located on the rear cover 106 of the mobile terminal 100 and the second fingerprint recognition region is located on the displaying screen 105 of the mobile terminal 100.

In an embodiment, when the first fingerprint recognition component 102 acquires the first fingerprint image in the first fingerprint recognition mode, the first fingerprint recognition component 102 is configured to acquire the first fingerprint image of a first finger in the first fingerprint recognition mode.

When the second fingerprint recognition component 103 acquires the second fingerprint image in the second fingerprint recognition mode, the second fingerprint recognition component 103 is configured to acquire the second fingerprint image of a second finger in the second fingerprint recognition mode. The first finger and the second finger are two different fingers belonging to a single hand.

Figure 1F:
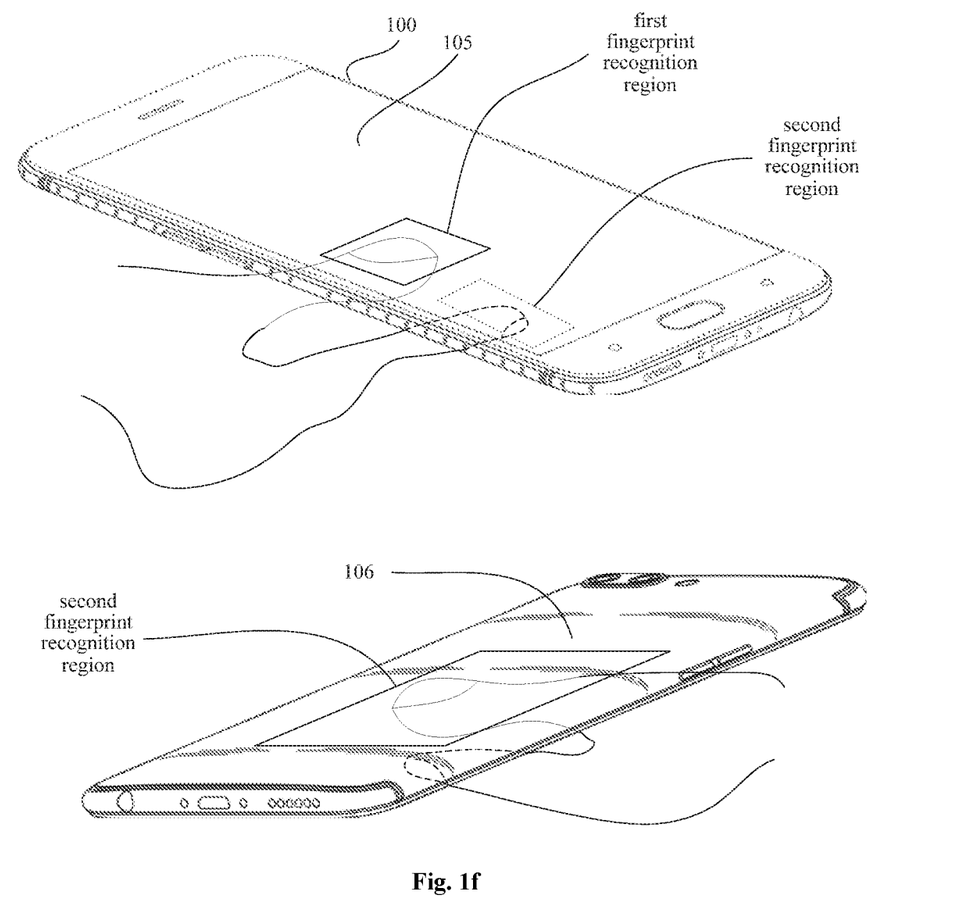
FIG. 1f is a schematic diagram illustrating two fingers pressing on a fingerprint region according to an embodiment of the present disclosure.

In an embodiment of the present disclosure, the mobile terminal 100 can be configured with a front capacitive fingerprint recognition component and a rear optical fingerprint recognition component. In another embodiment, the mobile terminal 100 can be configured with a front optical fingerprint recognition component and a rear capacitive fingerprint recognition component. In a scene, referring to FIG. 1f, FIG. 1f is a schematic diagram illustrating two fingers pressing on fingerprint regions according to an embodiment of the present disclosure. As illustrated in FIG. 1f, a user presses a first finger within the first fingerprint recognition region on the displaying screen 105 of the mobile terminal 100, and presses a second finger within the second fingerprint recognition region on the rear cover 106 of the mobile terminal 100. The first fingerprint recognition component 100 (for example, the capacitive fingerprint recognition component) acquires the first fingerprint image of the first finger in the first fingerprint recognition mode (for example, the capacitive fingerprint recognition mode). It is determined whether the first fingerprint image and the first enrolled fingerprint template are matched. If the first fingerprint image and the first enrolled fingerprint template are matched, it is determined that fingerprint is verified successfully. If the first fingerprint image and the first enrolled fingerprint template are not matched, the first fingerprint recognition component 102 continues to acquire the first fingerprint image of the first finger in the first fingerprint recognition mode and match the first fingerprint image and the first enrolled fingerprint template. When the predetermined number of consecutive occurrences of failure matching event is detected, the second fingerprint recognition component 103 (for example, the optical fingerprint recognition component) acquires the second fingerprint image of the second finger in the second fingerprint recognition mode (for example, the optical fingerprint recognition mode). It is determined whether the second fingerprint image and the second enrolled fingerprint template are matched. If the second fingerprint image and the second enrolled fingerprint template are matched, it is determined that fingerprint is verified successfully. If the second fingerprint image and the second enrolled fingerprint template are not matched, it is determined that fingerprint is not verified, i.e., the fingerprint verification failure occurs. In an embodiment of the present disclosure, the user may put two different fingers of a single hand within the first fingerprint recognition region and the second fingerprint recognition region respectively, such that the mobile terminal can switch the fingerprint recognition from the first fingerprint recognition mode to the second fingerprint recognition mode. In this way, the appropriate fingerprint recognition mode can be quickly selected for the fingerprint recognition, thereby the speed of fingerprint recognition is improved. Typically, when the user holds the mobile terminal with one hand, such that it is in conformity with the user experience that one finger of the hand presses the mobile terminal within the first fingerprint recognition region on the displaying screen and another finger of the hand presses the mobile terminal within the second fingerprint recognition region on the rear cover, thus improving the user experience.

The displaying screen 105 is configured to output prompt information before the second fingerprint recognition component 103 acquires the second fingerprint image in the second fingerprint recognition mode. The prompt information is configured to prompt a user to switch the first fingerprint recognition mode to the second fingerprint recognition mode.

In an embodiment of the present disclosure, when the predetermined number of consecutive occurrences of failure matching event is detected for the first fingerprint image, the displaying screen 105 can output the prompt information to prompt the user to switch the first fingerprint recognition mode to the second fingerprint recognition mode. In an embodiment of the present disclosure, when the user uses only one finger to perform the fingerprint recognition (for example, the user puts only one finger in the first fingerprint recognition region and no fingerprint image is detected in the second fingerprint recognition region), the user is prompted to put the finger in the second fingerprint recognition region, such that the mobile terminal can acquire the fingerprint image in the second fingerprint recognition mode. In the embodiment of the present disclosure, the user is prompted to switch the fingerprint recognition mode, such that the user experience can be improved.

In an embodiment, when the second fingerprint recognition region is located on the displaying screen 105, the displaying screen 105 is further configured to highlight the second fingerprint recognition region before the second fingerprint recognition component 103 acquires the second fingerprint image within the second fingerprint recognition region in the second fingerprint recognition mode. Highlighting the second fingerprint recognition region means that the boundary of the second fingerprint recognition region is highlighted, or the boundary of the second fingerprint recognition region flickers, or text information (for example, "please press finger in this region") is shown in the second fingerprint recognition region to prompt the user to press the finger in this region.

Figure 2:
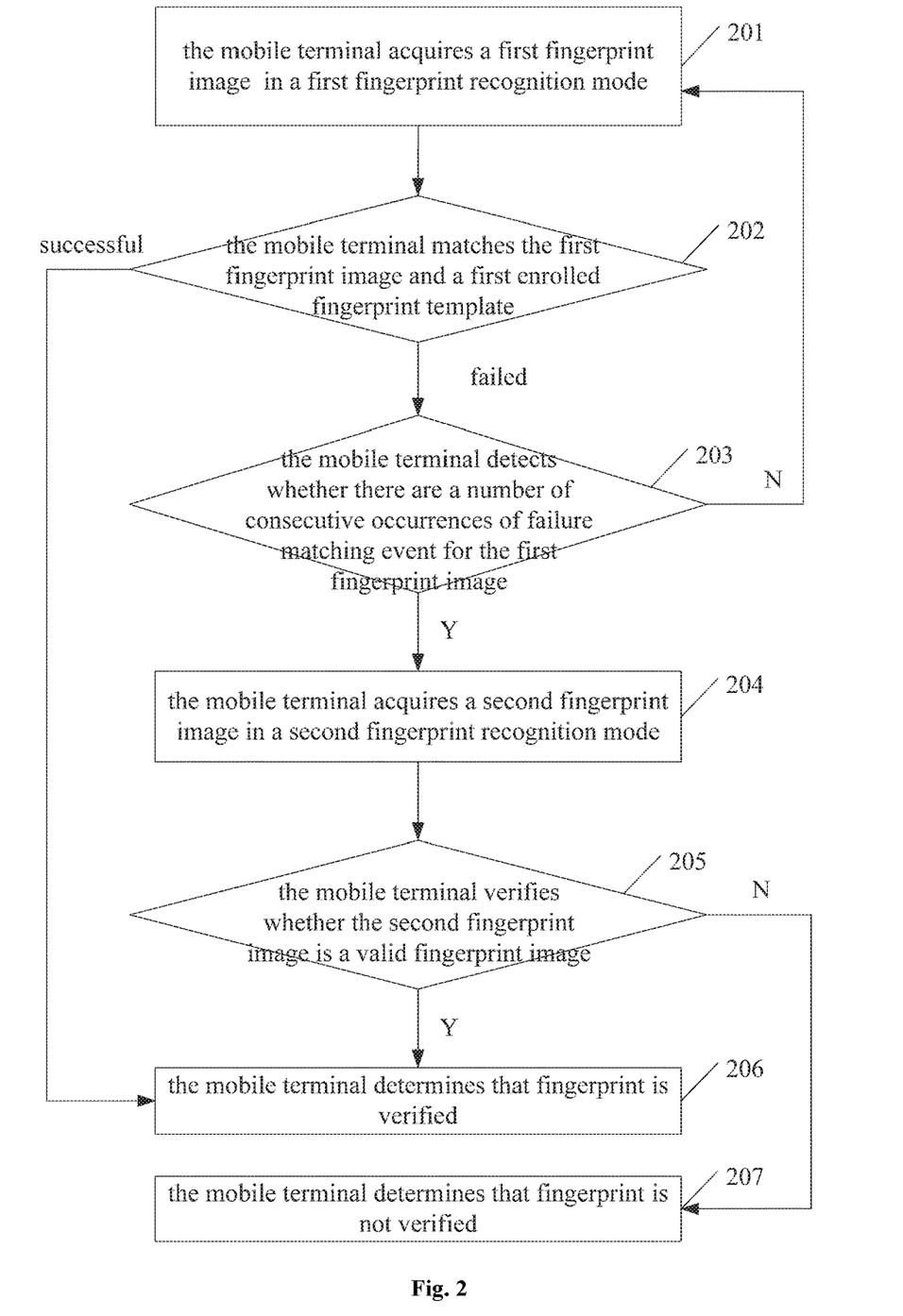
FIG. 2 is a flow chart of a fingerprint recognition method according to an embodiment of the present disclosure.

Referring to FIG. 2, FIG. 2 is a flow chart of a fingerprint recognition method according to an embodiment of the present disclosure. The method is applied in a mobile terminal including a circuitry, a first fingerprint recognition component and a second fingerprint recognition component. As illustrated in FIG. 2, the method includes the following.

At block 201, the mobile terminal acquires a first fingerprint image in a first fingerprint recognition mode.

In an embodiment, block 201 can be implemented as follows. The mobile terminal can acquire the first fingerprint image of a first finger within the first fingerprint recognition region in the first fingerprint recognition mode.

At block 202, the mobile terminal matches the first fingerprint image and a first enrolled fingerprint template. If the first fingerprint image and a first enrolled fingerprint template are matched, an act at block 206 is executed, otherwise, an act at block 203 is executed.

At block 203, the mobile terminal detects whether there are a number of consecutive occurrences of failure matching event for the first fingerprint image. If yes, an act at block 204 is executed, otherwise, an act at block 201 is executed.

At block 204, the mobile terminal acquires a second fingerprint image in a second fingerprint recognition mode.

In an embodiment, block 204 can be implemented as follows. The mobile terminal acquires the second fingerprint image of a second finger within the second fingerprint recognition region in the second fingerprint recognition mode. The first finger and the second finger are two different fingers belonging to one hand.

In an embodiment, the user may put two fingers of one hand into the first fingerprint recognition region and the second fingerprint recognition region respectively, such that the mobile terminal can switch the fingerprint recognition from the first fingerprint recognition mode to the second fingerprint recognition mode. In this way, the appropriate fingerprint recognition mode can be quickly selected for fingerprint recognition, thus improving the speed of fingerprint recognition.

At block 205, the mobile terminal verifies whether the second fingerprint image is a valid fingerprint image. If yes, an act at block 206 is executed, otherwise, an act at block 207 is executed.

At block 206, the mobile terminal determines that fingerprint is verified.

At block 207, the mobile terminal determines that fingerprint is not verified.

The first fingerprint recognition region is located on a displaying screen of the mobile terminal. The second fingerprint recognition region is located on a rear cover of the mobile terminal.

The first fingerprint recognition mode is a capacitive fingerprint recognition mode, and the second fingerprint recognition mode is an optical fingerprint recognition mode.

In another embodiment, the first fingerprint recognition mode is an optical fingerprint recognition mode, and the second fingerprint recognition mode is a capacitive fingerprint recognition mode.

Regarding the implementation of acts in FIG. 2, reference can be made to the device embodiments illustrated in FIG. 1*a* to FIG. 1*f*, which is not described herein.

When the method illustrated in FIG. 2 is implemented, if the predetermined number of consecutive occurrences of failure matching event are detected in the case of the first fingerprint recognition mode, the fingerprint recognition mode is switched to the second fingerprint recognition mode automatically, such that the appropriate fingerprint recognition mode can be quickly selected for fingerprint recognition, thus improving the speed of fingerprint recognition.

Figure 3:
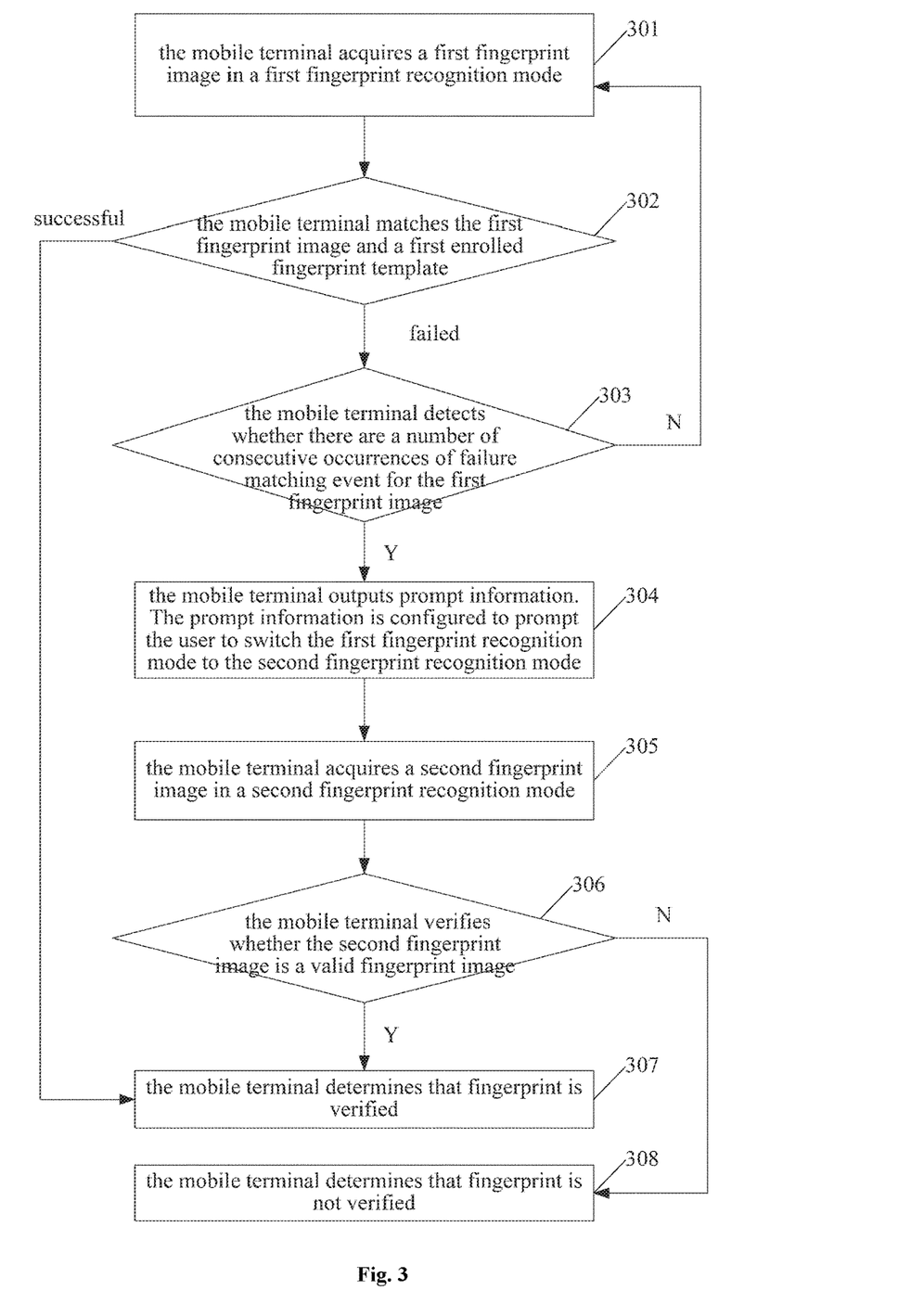
FIG. 3 is a flow chart of a fingerprint recognition method according to another embodiment of the present disclosure.

Referring to FIG. 3, FIG. 3 is a flow chart of a fingerprint recognition method according to another embodiment of the present disclosure. The method is applied in a mobile terminal including a circuitry, a first fingerprint recognition component and a second fingerprint recognition component. As illustrated in FIG. 3, the method includes the following.

At block 301, the mobile terminal acquires a first fingerprint image in a first fingerprint recognition mode.

At block 302, the mobile terminal matches the first fingerprint image and a first enrolled fingerprint template. If the first fingerprint image and the first enrolled fingerprint template are matched, an act at block 307 is executed, otherwise, an act at block 303 is executed.

At block 303, the mobile terminal detects whether there are a number of consecutive occurrences of failure matching event for the first fingerprint image. If yes, an act at block 304 is executed, otherwise, an act at block 301 is executed.

At block 304, the mobile terminal outputs prompt information. The prompt information is configured to prompt the user to switch the first fingerprint recognition mode to the second fingerprint recognition mode.

At block 305, the mobile terminal acquires a second fingerprint image in a second fingerprint recognition mode.

At block 306, the mobile terminal verifies whether the second fingerprint image is a valid fingerprint image. If yes, an act at block 307 is executed, otherwise, an act at block 308 is executed.

At block 307, the mobile terminal determines that fingerprint is verified.

At block 308, the mobile terminal determines that fingerprint is not verified.

Regarding the implementation of acts in FIG. 3, reference can be made to the device embodiments illustrated in FIG. 1*a* to FIG. 1*f*, which is not described herein.

When the method illustrated in FIG. 3 is implemented, if the predetermined number of consecutive occurrences of failure matching event are detected in the case of the first fingerprint recognition mode, the fingerprint recognition mode is switched to the second fingerprint recognition mode automatically, such that the appropriate fingerprint recognition mode can be quickly selected for fingerprint recognition, thus improving the speed of fingerprint recognition. In this embodiment of the present disclosure, the prompt information can be outputted to prompt the user to switch the fingerprint recognition mode, such that the user experience can be improved.

Figure 4:
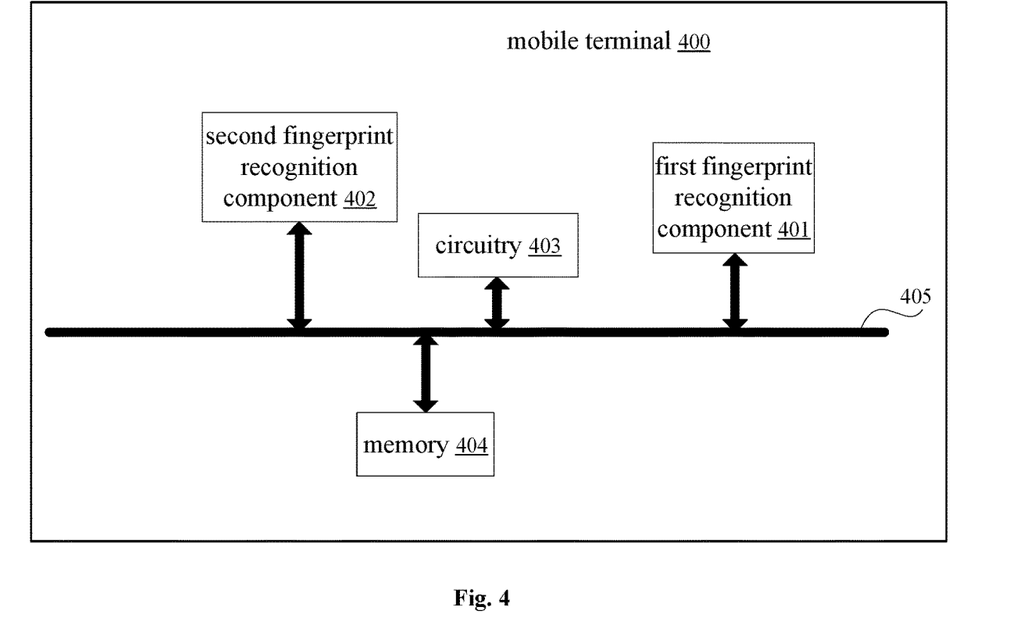
FIG. 4 is a structure diagram of a mobile terminal according to another embodiment of the present disclosure.

Referring to FIG. 4, FIG. 4 is a structure diagram of a mobile terminal according to an embodiment of the present disclosure. The mobile terminal 400 may include a first fingerprint recognition component 401, a second fingerprint recognition component 402, a circuitry 403, and a memory 404. The first fingerprint recognition component 401, the second fingerprint recognition component 402, the circuitry 403 and the memory 404 are coupled via a bus 405. The memory 404 is configured to store one or more programs which are configured to be executed by the circuitry 403. The one or more programs include instructions for performing a part or all of method steps illustrated in FIG. 2-FIG. 3.

When the mobile terminal illustrated in FIG. 4 is implemented, if the predetermined number of consecutive occurrences of failure matching event are detected in the case of the first fingerprint recognition mode, the mobile terminal switches the fingerprint recognition mode from the first fingerprint recognition mode to the second fingerprint recognition mode automatically, such that the appropriate fingerprint recognition mode can be quickly selected for fingerprint recognition, thus improving the speed of fingerprint recognition.

Figure 5:
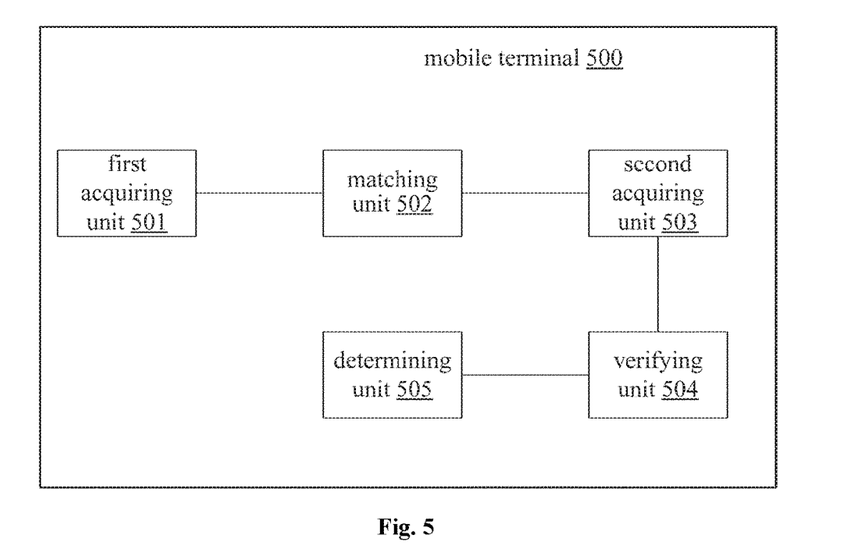
FIG. 5 is a structure diagram of a mobile terminal according to yet another embodiment of the present disclosure.

Referring to FIG. 5, FIG. 5 is a structure diagram of a mobile terminal according to another embodiment of the present disclosure. The mobile terminal 500 includes a first acquiring unit 501, a matching unit 502, a second acquiring unit 503, a verifying unit 504 and a determining unit 505.

The first acquiring unit 501 is configured to acquire a first fingerprint image in a first fingerprint recognition mode.

The matching unit 502 is configured to match the first fingerprint image and a first enrolled fingerprint template.

The second acquiring unit 503 is configured to acquire a second fingerprint image in a second fingerprint recognition mode in response to detecting a number of consecutive occurrences of failure matching event by the matching unit 502.

The verifying unit 504 is configured to verify whether the second fingerprint image is a valid fingerprint image.

The determining unit 505 is configured to determine that fingerprint is verified when the verifying unit 504 verifies that the second fingerprint image is the valid fingerprint image.

Regarding embodiments of the mobile terminal, reference can be made to the method embodiments illustrated in FIG. 2-FIG. 3, which are not described herein.

When the mobile terminal illustrated in FIG. 5 is implemented, if the predetermined number of consecutive occurrences of failure matching event are detected in the case of the first fingerprint recognition mode, the mobile terminal switches the fingerprint recognition mode from the first fingerprint recognition mode to the second fingerprint recognition mode automatically, such that the appropriate fingerprint recognition mode can be quickly selected for fingerprint recognition, thus improving the speed of fingerprint recognition.

Figure 6:
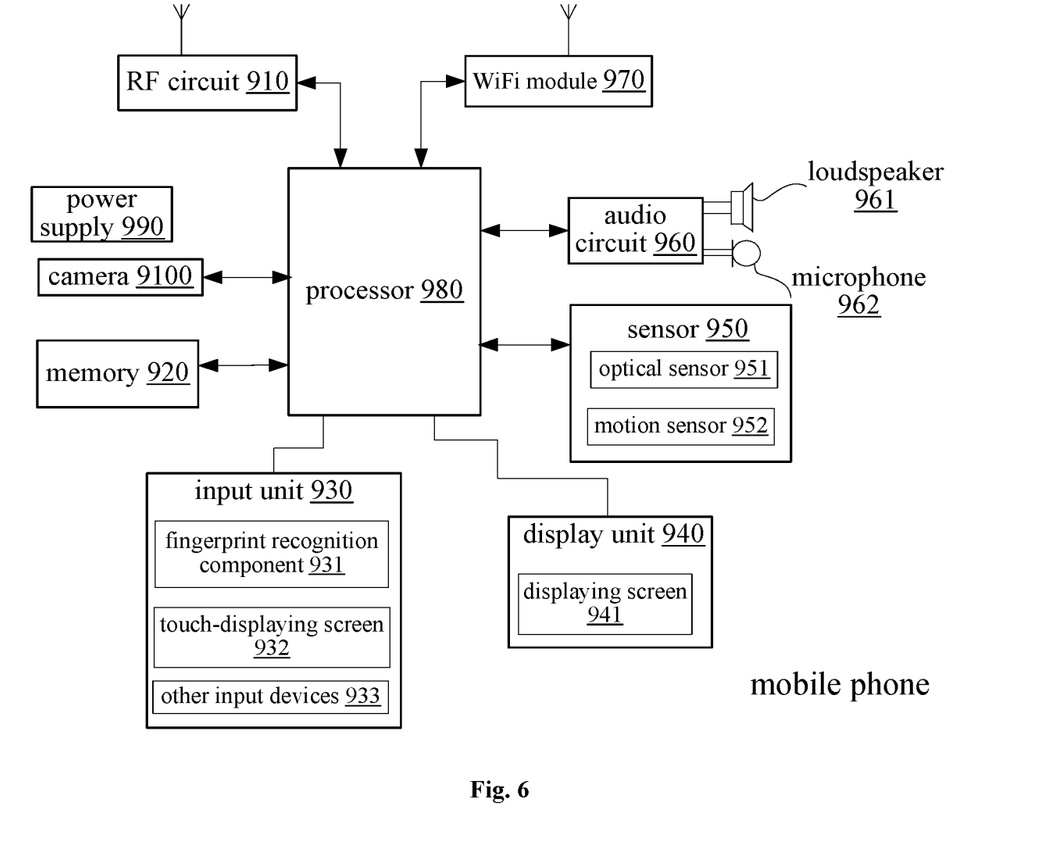
FIG. 6 is a structure diagram of a mobile terminal according to a still embodiment of the present disclosure.

Embodiments of the present disclosure also provide another mobile terminal, as illustrated in FIG. 6. For convenience of description, parts related to embodiments of the present disclosure are illustrated only. Regarding specific technical details which are not disclosed, reference can be made to the description of the method embodiments. The mobile terminal may include a mobile phone, a tablet computer, a personal digital assistant (PDA), a point of sales (POS), a vehicle-mounted computer and the like. The present disclosure takes the mobile phone as an example.

FIG. 6 illustrates a structure diagram of a mobile phone related to the mobile terminal provided by embodiments of the present disclosure. Referring to FIG. 6, the mobile phone may include a radio frequency (RF) circuit 910, a memory 920, an input unit 930, a display unit 940, a sensor 950, an audio circuit 960, a wireless fidelity (WiFi) module 970, a processor 980, and a power supply 990. It will be understood by those skilled in the art that the structure illustrated in FIG. 6 does not constitute a limitation on the mobile phone. Compared to the drawing illustrated, more or fewer components may be included, or a combination of some components or different component arrangements may also be possible.

Respective components of the mobile phone will be described in detail with reference to FIG. 6.

The RF circuit 910 may be configured to receive and send information. Generally, the RF circuit 910 includes, but is not limited to, an antenna, at least one amplifier, a transceiver, a coupler, a low noise amplifier (LNA), a duplexer and the like. In addition, the RF circuit 910 may also communicate with another device by a network and wireless communication. The wireless communication may use any communication standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 920 may be configured to store a software program and modules. The processor 980 runs the software program and modules stored in the memory 920, to implement various functional applications and data processes of the mobile phone. The memory 920 may mainly include a program storage area and a data storage area. The program storage area may store an operating system, an application program required by at least one function and the like. The data storage area may store data created according to usage of the mobile phone, and the like. In addition, the memory 920 may include a high speed random access memory, and may also include a non-volatile memory such as at least one magnetic disk storage device, a flash memory, or another volatile solid-state storage device.

The input unit 930 may be configured to receive input digital or character information, and a key signal input related to user's setup and functional control of the mobile phone. Specifically, the input unit 930 may include a fingerprint recognition component 931 (such as an optical fingerprint recognition component), a touch-displaying screen 932 and other input devices 933. The fingerprint recognition component 931 may acquire fingerprint data inputted by the user thereon. The input unit 930 may also include other input devices 933 besides the fingerprint recognition component 931. Specifically, other input devices 933 may include but not be limited to one or more of a physical button, a functional button (such as a volume control button, an ON-OFF button and the like), a trackball, a mouse and a joystick.

The display unit 940 may be configured to display information input by the user or information provided for the user, and various menus of the mobile phone. The display unit 940 may include a displaying screen 941. Optionally, the displaying screen 941 may be configured by using a liquid crystal display (LCD), an organic light-emitting diode (OLED), or the like. In FIG. 6, although the fingerprint recognition component 931 and the displaying screen 941 may be used as two separate components to realize the input and output function of the mobile phone, in some embodiments, the fingerprint recognition component 931 and the displaying screen 941 may be integrated to realize the input and playing function of the mobile phone.

The mobile phone may further include at least one sensor 950, such as an optical sensor 951, a motion sensor 952 and other sensors. Specifically, the optical sensor 951 may include an ambient light sensor and a proximity sensor. The ambient light sensor can adjust luminance of the displaying screen 941 according to brightness of the ambient light. The proximity sensor may switch off the displaying screen 941 and/or backlight when the mobile phone is moved to the ear. As one type of motion sensor 952, an acceleration sensor can detect acceleration values in various directions (generally on three axes), may detect magnitude and a direction of the gravity when the mobile phone is static, and may be applied to an application that recognizes the attitude of the mobile phone (for example, landscape/portrait screen switching, a related game, and magnetometer attitude calibration), a function related to vibration recognition (such as a pedometer and a knocking), and the like. In addition, the mobile phone can be configured with other sensors, such as a barometer, a hygrometer, a thermometer, and an infrared sensor, which are not further described herein.

The audio circuit 960, a loudspeaker 961, and a microphone 962 may provide audio interfaces between the user and the mobile phone. The audio circuit 960 may convert received audio data into an electrical signal and transmit the electrical signal to the loudspeaker 961. The loudspeaker 961 converts the electrical signal into a sound signal for outputting. On the other hand, the microphone 962 converts a collected sound signal into an electrical signal. The audio circuit 960 receives the electrical signal and converts the electrical signal into audio data, and outputs the audio data to the processor 980 for processing. Then, the processor 980 sends the audio data to, for example, another mobile terminal by using the RF circuit 910, or outputs the audio data to the memory 920 for further processing.

WiFi is a short distance wireless transmission technology. The mobile phone may help, by using the WiFi module 970, the user to receive and send e-mails, browse a webpage, access streaming media, and so on. The WiFi module 970 provides wireless broadband Internet access for the user. Although the WiFi module 970 is illustrated in FIG. 6, it can be understood that, the WiFi module 970 is not essential for the mobile phone, and may be omitted when required as long as the scope of the essence of the present disclosure is not changed.

The processor 980 is a control center of the mobile phone, which can use various interfaces and wires to couple respective parts of the mobile phone, and perform various functions and processing data of the mobile phone by running or executing software programs and/or modules stored in the memory 920 and calling data stored in the memory 920, so as to monitor the mobile phone overall. In an embodiment, the processor 980 may include one or more processing units. In an embodiment, the processor 980 may integrate an application processor and a modem processor, in which the application processor is mainly configured to process the operating system, the user interface and applications, and the modem processor is mainly configured to process wireless communication. It could be understood that the above-described modem processor may be not integrated in the processor 980.

The mobile phone further includes the power supply 990 (such as a battery) for supplying power to the components. In an embodiment, the power supply may be logically coupled with the processor 980 by using a power management system, thereby implementing functions such as charging, discharging and power consumption management by using the power management system.

The mobile phone further includes a camera 9100. The camera 9100 may include a front camera, an iris camera and a rear camera.

Although not illustrated in the figure, the mobile phone may further include a Bluetooth module, a flashlight and the like. The flashlight may include a front flashlight and a rear flashlight. The front flashlight is configured as supplementary lighting for the front camera. The rear flashlight can be configured as supplementary lighting for the rear camera. The front flashlight may include a front visible flashlight and a front infrared flashlight. The front visible flashlight is configured as supplementary lighting for the front camera. The front infrared flashlight is configured as supplementary lighting for the iris camera.

Embodiments of the present disclosure also provide a computer readable storage medium having computer programs for exchanging digital data stored thereon, in which the computer programs are executed to perform all or a part of acts of the method according to the above method embodiments of the present disclosure.

Embodiments of the present disclosure also provide a computer program product including a non-transitory computer-readable medium storing computer programs, in which the computer programs are executed to perform all or a part of acts of the method according to the above method embodiments of the present disclosure.

It should be noted that, for convenience and simplicity of description, the above method embodiments are described in a form of a combination of a series of steps. However, those skilled in the art can understand clearly that, the present disclosure is not limited by the order of the steps, since some steps may be performed simultaneously or in other orders according to present disclosure. In addition, those skilled in the art can understand clearly that, the described embodiments are preferred embodiments, of which relative steps or modules may be unnecessary for the present disclosure.

In above embodiments, each embodiment may be described with focusing on different aspects. Parts not be described in some embodiments may refer to relative descriptions in other embodiments.

It should be understood that, the apparatus disclosed in several embodiments provided by the present disclosure can be realized in any other manner. For example, the apparatus embodiments described above can be merely exemplary, for example, the units are just divided according to logic functions. In practical implementation, the units can be divided in other manners, for example, multiple units or components can be combined or integrated into another system, or some features can be omitted or not executed. In addition, the mutual coupling or direct coupling or communication connection described or discussed can be via some interfaces, and indirect coupling or communication connection between devices or units may be electrical, mechanical or of other forms.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, respective functional units in respective embodiments of the present disclosure can be integrated into one processing unit, or can be present as separate physical entities. It is also possible that two or more than two units are integrated into one unit. The integrated units may be implemented in form of hardware, or in form of functional software units.

If the integrated unit is implemented in form of functional software units and are sold or used as separate products, it can be stored in a computer readable storage medium. Based on this understanding, the parts of the technical solutions or the essential parts of the technical solutions (i.e. the parts making a contribution to the related art) can be embodied in form of software product, which is stored in a storage medium, and includes several instruction used for causing a computer device (for example, a personal computer, a server or a network device) to execute all or part of steps in the methods described in respective embodiments of the present disclosure. The above storage medium may be any medium capable of storing program codes, including a USB flash disk, a mobile hard disk, a Read-Only Memory (ROM), a Random Access Memory (RAM), a disc, or a light disk.

It should be understood that all or a part of the method provided by the present disclosure may be realized by programs instructing relative hardware, the programs may be stored in a computer-readable memory. The memory may include a flash disk, an ROM, an RAM, a magnet disk, a light disk and the like.

The forgoing description is only directed to preferred embodiments of the present disclosure, but not used to limit the present disclosure. All modifications, equivalents, variants and improvements made within the spirit and principle of the present disclosure shall fall within the protection scope of the present disclosure. Thus, the protection scope of the present disclosure shall be limited by the protection scope of the claims.

What is claimed is:

1. A mobile terminal, comprising a circuitry, a first fingerprint recognition component associated with the circuitry, and a second fingerprint recognition component associated with the circuitry, wherein, the first fingerprint recognition component is configured to acquire a first fingerprint image within a first fingerprint recognition region of the mobile terminal in a first fingerprint recognition mode;

the circuitry is configured to match the first fingerprint image and a first enrolled fingerprint template;

the second fingerprint recognition component is configured to acquire a second fingerprint image within a second fingerprint recognition region of the mobile terminal in a second fingerprint recognition mode, in response to detecting a number of consecutive occurrences of failure matching event, wherein the first fingerprint recognition mode is different from the second fingerprint recognition mode;

the circuitry is further configured to verify whether the second fingerprint image is a valid fingerprint image, and the first fingerprint recognition region does not overlap with the second fingerprint recognition region;

wherein the mobile terminal further comprises a displaying screen and a rear cover, when the second fingerprint recognition region is located on the displaying screen, the displaying screen is further configured to highlight the second fingerprint recognition region; wherein highlighting the second fingerprint recognition region comprises: highlighting a boundary of the second fingerprint recognition region; flickering the boundary of the second fingerprint recognition region or showing text information in the second fingerprint recognition region.

2. The mobile terminal according to claim 1, wherein, when the circuitry matches the first fingerprint image and the first enrolled fingerprint template, the circuitry is configured to:

extract a fingerprint feature from the first fingerprint image; and match the extracted fingerprint feature and the first enrolled fingerprint template.

3. The mobile terminal according to claim 1, wherein, when the circuitry verifies whether the second fingerprint image is a valid fingerprint image, the circuitry is configured to:

match the second fingerprint image and a second enrolled fingerprint template corresponding to the second fingerprint recognition mode.

4. The mobile terminal according to claim 1, wherein, the displaying screen is further configured to output prompt information, wherein the prompt information is configured to prompt a user to switch the first fingerprint recognition mode to the second fingerprint recognition mode.

5. The mobile terminal according to claim 1, wherein, the first fingerprint recognition mode is one of a capacitive fingerprint recognition mode and an optical fingerprint recognition mode, and the second fingerprint recognition mode is the other one of the capacitive fingerprint recognition mode and the optical fingerprint recognition mode.

6. A fingerprint recognition method, comprising:

acquiring a first fingerprint image within a first fingerprint recognition region of the mobile terminal in a first fingerprint recognition mode;

matching the first fingerprint image and a first enrolled fingerprint template;

acquiring a second fingerprint image within a second fingerprint recognition region of the mobile terminal in a second fingerprint recognition mode, in response to detecting a number of consecutive occurrences of failure matching event, wherein the first fingerprint recognition mode is different from the second fingerprint recognition mode, and the first fingerprint recognition region does not overlap with the second fingerprint recognition region;

verifying whether the second fingerprint image is a valid fingerprint image; and determining that fingerprint is verified when the second fingerprint image is the valid fingerprint image;

wherein when the second fingerprint recognition region is located on a displaying screen of the mobile terminal, the method further comprises: highlighting the second fingerprint recognition region; wherein highlighting the second fingerprint recognition region comprises: highlighting a boundary of the second fingerprint recognition region; flickering the boundary of the second fingerprint recognition region or showing text information in the second fingerprint recognition region.

7. The method according to claim 6, further comprising:
determining that fingerprint is verified in response to detecting a successful matching event prior to the number of consecutive occurrences of failure matching event.

8. The method according to claim 6, wherein, matching the first fingerprint image and the first enrolled fingerprint template comprises:
extracting a fingerprint feature from the first fingerprint image; and
matching the extracted fingerprint feature and the first enrolled fingerprint template.

9. The method according to claim 6, wherein, verifying whether the second fingerprint image is a valid fingerprint image comprises:
matching the second fingerprint image and a second enrolled fingerprint template corresponding to the second fingerprint recognition mode.

10. The method according to claim 6, wherein the method further comprises:
outputting prompt information, wherein the prompt information is configured to prompt a user to switch the first fingerprint recognition mode to the second fingerprint recognition mode.

11. The method according to claim 6, wherein,
the first fingerprint recognition mode is one of a capacitive fingerprint recognition mode and an optical fingerprint recognition mode, and the second fingerprint recognition mode is the other one of the capacitive fingerprint recognition mode and the optical fingerprint recognition mode.

12. A non-transitory computer readable storage medium having computer programs for exchanging digital data stored thereon, wherein the computer programs are configured to cause a computer to perform the method comprising:
acquiring a first fingerprint image within a first fingerprint recognition region of the mobile terminal in a first fingerprint recognition mode;
matching the first fingerprint image and a first enrolled fingerprint template;
acquiring a second fingerprint image within a second fingerprint recognition region of the mobile terminal in a second fingerprint recognition mode, in response to detecting a number of consecutive occurrences of failure matching event, wherein the first fingerprint recognition mode is different from the second fingerprint recognition mode, and the first fingerprint recognition region does not overlap with the second fingerprint recognition region;
verifying whether the second fingerprint image is a valid fingerprint image; and
determining that fingerprint is verified when the second fingerprint image is the valid fingerprint image;
wherein when the second fingerprint recognition region is located on a displaying screen of the mobile terminal, the method further comprises: highlighting the second fingerprint recognition region; wherein highlighting the second fingerprint recognition region comprises: highlighting a boundary of the second fingerprint recognition region; flickering the boundary of the second fingerprint recognition region or showing text information in the second fingerprint recognition region.

* * * * *